US012479232B2

United States Patent

(12) United States Patent
Chatzigrigoriou et al.
(10) Patent No.: US 12,479,232 B2
(45) Date of Patent: Nov. 25, 2025

(54) POROUS CAP FELT PEN

(71) Applicants: BIC Violex Single Member S.A., Anoixi (GR); SOCIÉTÉ BIC, Clichy (FR)

(72) Inventors: Nikolaos Chatzigrigoriou, Anoixi (GR); Julien Lintermy, Clichy (FR); Michail Kokozidis, Anoixi (GR); Anestis Tsegenidis, Anoixi (GR)

(73) Assignees: BIC Violex Single Member S.A., Anoixi (GR); SOCIÉTÉ BIC, Clichy (FR)

(*) Notice: Subject to any disclaimer, the term of this patent is extended or adjusted under 35 U.S.C. 154(b) by 0 days.

(21) Appl. No.: 18/752,250

(22) Filed: Jun. 24, 2024

(65) Prior Publication Data

US 2025/0033401 A1 Jan. 30, 2025

(30) Foreign Application Priority Data

Jul. 28, 2023 (EP) .................................... 23306308

(51) Int. Cl.
*B43K 1/12* (2006.01)
*B43K 1/01* (2006.01)
*B43K 23/12* (2006.01)

(52) U.S. Cl.
CPC .................. *B43K 1/12* (2013.01); *B43K 1/01* (2013.01); *B43K 23/128* (2013.01)

(58) Field of Classification Search
CPC .......... B43K 1/003; B43K 1/006; B43K 1/12; B43K 8/04; B43K 8/06; B43K 8/08; B43K 23/128; B43K 27/08
USPC ......................... 401/198, 199, 202, 205, 206
See application file for complete search history.

(56) References Cited

U.S. PATENT DOCUMENTS

| | | | | |
|---|---|---|---|---|
| 2,853,727 A * | 9/1958 | Nadai | B65D 47/42 | 401/199 |
| 2,853,728 A * | 9/1958 | Nadai | B65D 47/42 | 401/207 |
| 3,393,963 A | 7/1968 | Nadai | | |
| 5,813,787 A * | 9/1998 | Dowzall | B43K 5/1845 | 401/199 |
| 6,439,793 B1 * | 8/2002 | Nishitani | B43K 5/00 | 401/266 |

(Continued)

FOREIGN PATENT DOCUMENTS

| | | |
|---|---|---|
| EP | 4011638 A1 | 6/2022 |
| JP | 2015160327 A | 9/2015 |

OTHER PUBLICATIONS

Extended European Search Report issued in priority application No. EP 23306308.0, mailed Apr. 23, 2024.

*Primary Examiner* — David P Angwin
*Assistant Examiner* — Bradley S Oliver
(74) *Attorney, Agent, or Firm* — Bookoff McAndrews, PLLC

(57) ABSTRACT

According to an aspect, a writing instrument is provided. The writing instrument includes a reservoir for storing writing ink, a nib arranged distally to the reservoir and in fluid communication with the reservoir, a porous membrane or mesh surrounding at least a distal portion of the nib, wherein, in a writing position, the porous membrane or mesh is configured to contact the nib, thereby allowing ink to penetrate through the porous membrane or mesh.

20 Claims, 2 Drawing Sheets

(56) References Cited

U.S. PATENT DOCUMENTS

| | | | | |
|---|---|---|---|---|
| 6,715,950 | B2 * | 4/2004 | Kim | B43K 27/08 401/35 |
| 8,215,861 | B2 | 7/2012 | Gueret | |
| 10,172,432 | B2 * | 1/2019 | Paquet | A45D 40/12 |
| 11,827,048 | B2 * | 11/2023 | Roudaut | B43K 1/12 |
| 2022/0184994 | A1 | 6/2022 | Polygerinos et al. | |
| 2022/0281260 | A1 * | 9/2022 | Fukada | B43K 23/126 |
| 2022/0297466 | A1 | 9/2022 | Roudaut et al. | |

* cited by examiner

POROUS CAP FELT PEN

CROSS-REFERENCE TO RELATED APPLICATIONS

This application claims priority from European Patent Application No. 23306308, filed on Jul. 28, 2023, the contents of which are hereby incorporated herein in their entirety by this reference.

TECHNICAL FIELD

The present disclosure relates to the field of writing devices. More specifically, the present disclosure relates to writing devices that dispense volatile inks, such as felt tip markers and the like.

BACKGROUND

The present disclosure relates to writing instruments that dispense volatile inks, such as felt tip markers, highlighters, non-permanent and permanent markers, and the like. Commonly, felt pens comprise a writing tip in the form of a nib and a cap to close off the nib. The nib is typically kept wet by the ink used for writing. Closing of the cap may be necessary to prevent the solvents of the ink from evaporating which could lead to the nib drying out within a few hours. A dried-out nib may impair the writing quality of the nib or render the entire felt pen irreversibly useless. Further, an uncovered nib can lead to unintentional stains on surfaces, e.g., clothes or skin of the user. Also, it may be tedious for the user to recap a felt pen after every use, especially when drawing with multiple colors. Further, a cap may be displaced leading to the nib drying out.

More recently, retractable felt pens have been developed. However, such retractable felt pens may require a sealing chamber which needs to comprise a complex mechanism to open and close every time the nib is slid in or out. Additionally, this kind of solution requires additional action by the user, e.g., retracting the nib with use of any kind of button mechanism. A solution to this may be the use of self-healing films that prevent evaporation of solvents when the nib is in its retracted position. When the nib is moved to the extended position the self-healing film may be penetrated. Subsequently, when the nib moves back to its retracted position the self-healing film may reseal the sealing chamber without the need for a complex mechanism. However, the material for self-healing films may be costly.

The present disclosure aims to address one or more problems in the prior art.

SUMMARY

According to a first aspect, a writing instrument is provided. The writing instrument comprises a reservoir for storing writing ink, a nib arranged distally to the reservoir and in fluid communication with the reservoir, a porous membrane or mesh surrounding at least a distal portion of the nib, wherein, in a writing position, the porous membrane or mesh is configured to contact the nib, thereby allowing ink to penetrate through the porous membrane or mesh.

According to a second aspect, a method for manufacturing a writing instrument is provided. The writing instrument comprises a tubular body, a porous membrane or mesh surrounding at least a distal portion of the nib, wherein, in a writing position, the porous membrane or mesh is configured to contact the nib, thereby allowing ink to penetrate through the porous membrane or mesh, and/or a cap assembly, further comprising the porous membrane or mesh, an elastic part comprising at least one writing orifice and surrounding at least a distal portion of the nib, wherein the wall thickness and radius of the writing orifice are configured such that in a non-writing position the elastic part extends beyond the nib along a longitudinal axis of the writing instrument, and wherein, in a writing position, the cap assembly is configured to contact the nib, thereby allowing ink to penetrate through the porous membrane or mesh, wherein the method comprises connecting the porous membrane or mesh 150 and/or the cap assembly 170 to the tubular body 110 using permanent interconnection or non-permanent interconnection.

The writing instrument of the present disclosure may provide a felt pen system that does not necessarily need an ordinary cap to prevent the nib from drying out in a short time. Further, no complex retractable sealing chamber mechanism is needed. The writing instrument may prolong the evaporation drying out time of the writing ink from the nib and may enable a writing instrument that is usable for a longer time span. This can significantly reduce the number of felt pens needed in a given period of time which can help reduce the amount of waste and increase sustainability. Further, the porous membrane or mesh may have substantially lower costs compared to other similar solutions such as self-healing polymers. The porous membrane or mesh may enable a compact design since it has a dual function: When being in contact with the nib the porous membrane or mesh allows the penetration of the ink while in a non-writing position the porous membrane or mesh is not in contact with the nib and may act as a barrier cover preventing the evaporation of the ink.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
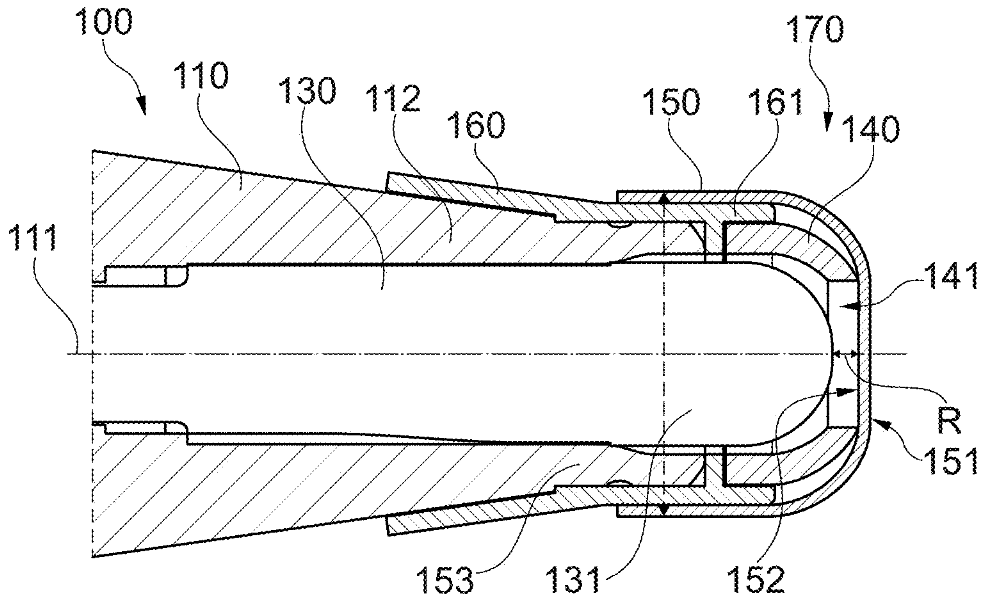
FIG. 1 schematically illustrates exemplary a part of the writing instrument near a distal end of a tubular body of the writing instrument in a cross-sectional view along a longitudinal axis of the writing instrument.

FIG. 1 schematically illustrates exemplary a part of the writing instrument 100 near a distal end 112 of a tubular body 110 of the writing instrument 100 in a cross-sectional view along a longitudinal axis 111 of the writing instrument.

According to the first aspect, the writing instrument 100 comprises a reservoir 120 for storing writing ink, a nib 130 arranged distally to the reservoir 120 and in fluid communication with the reservoir 120, a porous membrane or mesh 150 surrounding at least a distal portion of the nib 130, wherein, in a writing position, the porous membrane or mesh

Figure 3:
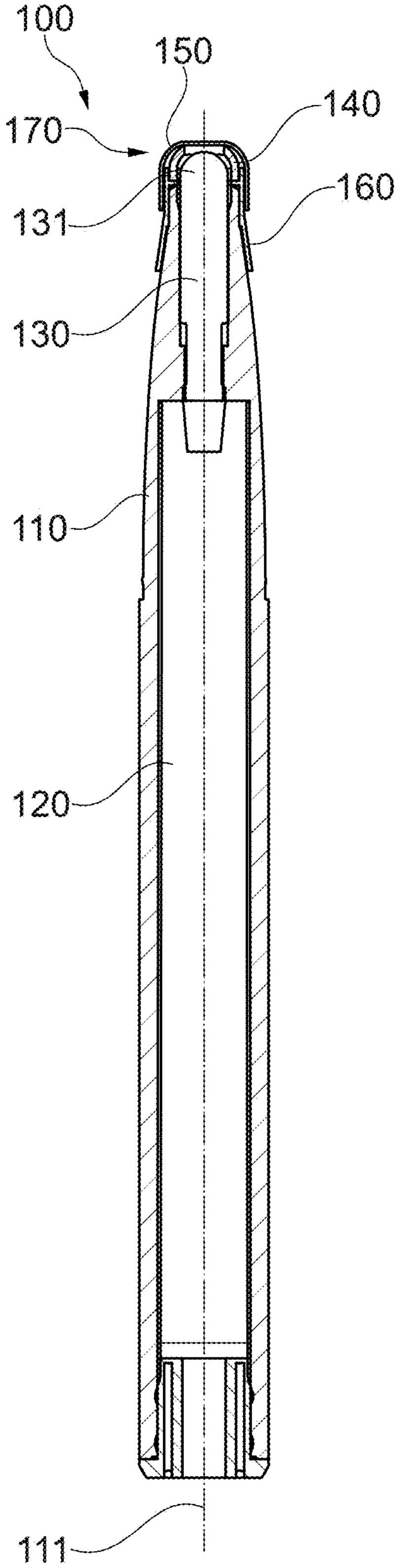
FIG. 3 schematically illustrates an example of the writing instrument according to embodiments of the present disclosure in a cross-sectional view along the longitudinal axis of the writing instrument.

150 is configured to contact the nib 130, thereby allowing ink to penetrate through the porous membrane or mesh 150. As exemplary shown in FIG. 1, the porous membrane or mesh 150 may surround the nib 130. The nib 130 may be dome-shaped at a distal portion facing a first end of the writing instrument 100. In examples, at least in an area where the porous membrane or mesh surrounds the distal portion of the nib 130 the porous membrane or mesh may be dome-shaped. In examples, the nib 130 may comprise a proximal portion opposite the distal portion 131. In examples, the nib 130 may be in fluid communication with the reservoir 120 at the proximal portion as shown in FIG. 3 For example, the nib 130 may be configured to absorb the writing ink stored in the reservoir 120 and may be configured to direct the writing ink towards the distal portion of the nib 130. In examples, the nib 130 may be configured to absorb and release the writing ink in a way similar to a sponge. In examples, the ink is allowed to penetrate through a plurality of pores of the porous membrane or mesh 150.

In embodiments, the porous membrane or mesh 150 may be configured to yield starting from a non-writing position towards the writing position when pressure is applied to a first surface 151 of the porous membrane or mesh 150 facing away from the nib 130. In examples, the main effective direction of the pressure may be along the longitudinal axis 111 of the writing instrument 100 towards the distal portion of the nib 130. The porous membrane or mesh 150 may be elastic and may be configured to return to its original shape when pressure is removed from the first surface 151 of the porous membrane or mesh 150.

The writing instrument 100 may further comprise a cap assembly 170. The cap assembly 170 may comprise the porous membrane or mesh 150, an elastic part 140 comprising at least one writing orifice 141 and surrounding at least the distal portion 131 of the nib 130. In examples, the wall thickness and radius of the writing orifice 141 may be configured such that in the non-writing position the porous membrane or mesh 150 along with the elastic part 140 may extend beyond the nib 130 along a longitudinal axis 111 of the writing instrument 100. In that way, the nib 130 may be protected from external accidental strokes and moreover the surface area of the nib 130 that is otherwise potentially exposed to air is reduced. In examples, in a writing position, the cap assembly 140 may be configured to contact the nib 130, thereby allowing ink to penetrate through the porous membrane or mesh 150. In examples, the porous membrane or mesh 150 may surround the elastic part 140 on a surface of the elastic part 140 facing away from the distal portion 131 of the nib 130.

In embodiments, the elastic part 140 may be configured to yield starting from the non-writing position towards the writing position when pressure is applied to a first surface of the cap assembly 170 facing away from the nib 130. In examples, when pressure is applied to the first surface 151 of the porous membrane or mesh 150 pressure is applied to at least partial areas of the elastic part 140. In examples, the first surface of the cap assembly 170 may be the first surface 151 of the porous membrane or mesh 150. In examples, the elastic part 140 may be configured to move towards the distal portion 131 of the nib 130 such that the porous membrane or mesh 150 may be able to contact the distal portion of the nib 130 to allow ink to penetrate through the porous membrane or mesh 150. The effect of writing ink penetrating through may comprise the effect of absorbing the writing ink by the porous membrane or mesh 150. In examples, the writing ink may permeate the porous membrane or mesh 150. In examples, the writing ink may permeate the porous membrane or mesh 150 in areas which do not contact the nib 130 when pressure is applied to the first surface of the cap assembly 170 and/or the first surface 151 of the porous membrane or mesh 150.

In embodiments, in the non-writing position the porous membrane or mesh 150 may be configured to not contact the nib, thereby allowing the ink to dry on the porous membrane or mesh 150 and form a barrier to reduce ink evaporation through the nib or drying-out of the nib. In that way the evaporation of the solvents of the ink is reduced, which would lead to the nib drying out within a few hours. In examples, the reduction of the evaporating effect may depend on the mesh size and/or the material of the porous membrane or mesh 150.

In embodiments, in the non-writing position the porous membrane or mesh 150 may be not in contact with the nib 130. In examples and as mentioned above, the cap assembly 170 and/or the porous membrane or mesh 150 may be configured to return to the non-writing position when no pressure is applied to the first surface 151 of the cap assembly 170. As mentioned above, this may allow the ink to dry on the porous membrane or mesh 150 and form a barrier to reduce ink evaporation through the nib or drying-out of the nib.

In embodiments, the cap assembly 170 may be configured to yield starting from the non-writing position towards the nib 130 based on an elastic material of the elastic part 140.

The writing instrument 100 may further comprise a tubular body 110 comprising a distal end 112. The cap assembly 170 may be attached to the distal end 112 of the tubular body 110. In examples, a spring-based mechanism may be attached to the tubular body 110 at the distal end 112 on a circumferential surface of the tubular body 110 facing a circumferential surface of the cap assembly 170. In embodiments, the cap assembly 170 may be movable attached to the distal end 112 of the tubular body 110. This may allow the porous membrane or mesh 150 to contact the nib 130 when pressure is applied to the first surface 151 of the porous membrane or mesh 150 and/or the elastic part 140. In embodiments, the elastic cap assembly 170 may be attached to the distal end of the tubular body via a sliding mechanism which may be configured to move along the longitudinal axis 111 of the writing instrument 100. This may allow the porous membrane or mesh 150 to contact the nib 130 when pressure is applied to the first surface 151 of the porous membrane or mesh 150 and/or the cap assembly 170. The sliding mechanism may further comprise a spring-based return mechanism to allow the elastic cap assembly 170 to return to the non-writing position when the pressure is no longer applied to the porous membrane or mesh 150 and/or the elastic cap assembly 170. In embodiments, the elastic material of the elastic part 140 allows deformation of the elastic part 140 at least towards the distal portion 131 of the nib 130. This may allow the porous membrane or mesh 150 to contact the nib 130 when pressure is applied to the first surface 151 of the porous membrane or mesh 150 and/or the elastic part 140.

Figure 2:
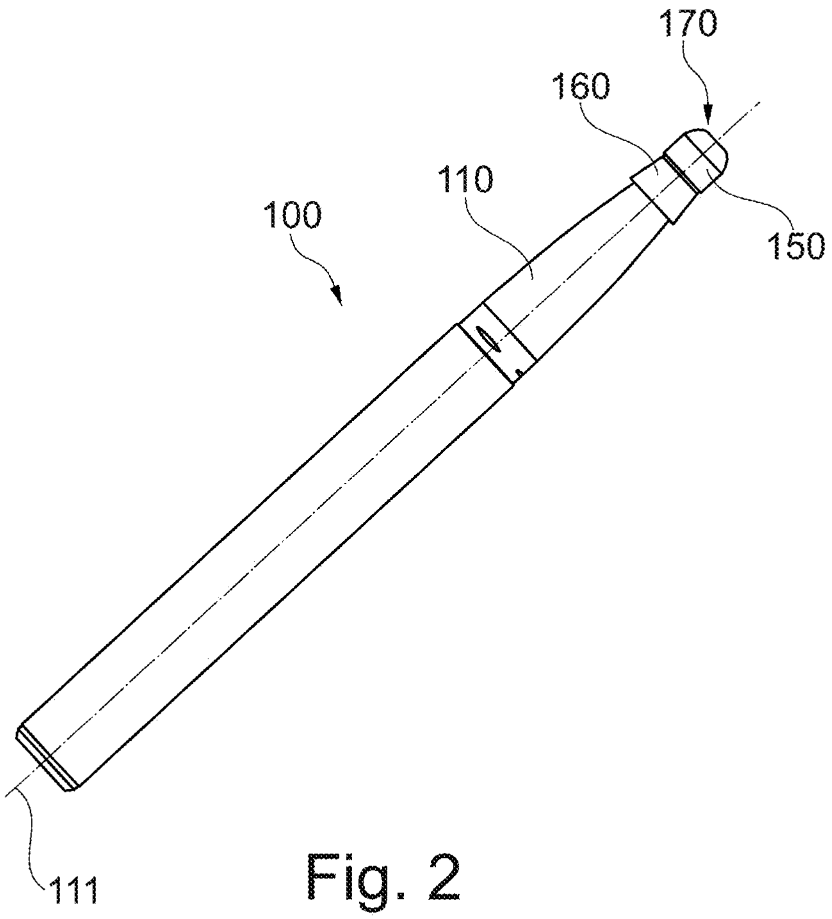
FIG. 2 schematically illustrates an example of the writing instrument according to embodiments of the present disclosure.

The writing instrument 100 may further comprise a support element 160 attached to the distal end 112 of the tubular body 110 to serve as a connector between the tubular body 110 and the cap assembly 170. The support element 160 may comprise a protruding portion 161 extending beyond the distal end of the tubular body 110. In embodiments, the porous membrane or mesh 150 may be attached to the protruding portion 161. FIG. 1 and FIG. 2 show exemplary the support element 160. In embodiments, the support element 160 may be attached to the distal end 112 of the tubular body 110 on an inner circumferential surface or an outer circumferential surface of the tubular body 110. In embodiments, the support element 160 may comprise a circumferential support ring extending in a direction vertical to the protruding portion 161. The circumferential support ring may have a surface facing the cap assembly 170 and may serve as a contact surface between the cap assembly 170 and the support element 160 itself. In examples, the porous membrane or mesh 150 may be attached to the protruding portion 161 on an outer circumferential surface of the support element 160. In examples, the porous membrane or mesh 150 may be attached to the protruding portion 161 on an inner circumferential surface of the support element 160.

In embodiments, the pressure is applied to the first surface 151 of the porous membrane or mesh 150 when a user writes the writing instrument 100 on a writing surface. In examples, the writing surface may be paper, a whiteboard or skin. In examples, the effective direction of the pressure may depend on the inclination of the pen in relation to the writing surface. In some examples, the effective direction may comprise three vector components wherein one vector component extends in the direction of the longitudinal axis 111 of the writing instrument 100.

In embodiments, in the non-writing position, a distance R along a longitudinal axis 111 of the writing instrument 100 between a second surface 152 of the porous membrane or mesh 150 facing the nib 130 and the extremity of the nib 130 may be between a value greater than 0 and a value equal to an external diameter 153 of the porous membrane or mesh 150 measured vertically to the longitudinal axis 111. In examples, the distance R between the second surface 152 of the porous membrane or mesh 150 facing the nib 130 and the extremity of the nib 130 may correspond to the distance the porous membrane or mesh 150 is configured to cover when yielding starting from the non-writing position towards the writing position.

In embodiments and as mentioned above, the elastic part 140 may be dome-shaped around the distal portion 131 of the nib 130, and the writing orifice 141 is centered with respect to the longitudinal axis 111 of the writing instrument 100. In examples, the writing orifice 141 allows the porous membrane or mesh 150 to contact the nib 130. In examples, the radius of the writing orifice 141 may be smaller than the radius of the elastic part 140 at a point where the circumferential surface of the elastic part 140 does not yet curve into a dome shape. In that way, the nib 130 may be protected from external accidental strokes and moreover the surface area of the nib 130 that is otherwise potentially exposed to air is reduced.

In embodiments, the cap assembly 170 and/or the support element 160 may be configured to be connected to the tubular body 110 using permanent interconnection or non-permanent interconnection. In examples, the permanent interconnection comprises ultrasonic welding, snap fitting, adhesive bonding, solvent bonding, hot plate welding, spin welding, or insert molding. In embodiments, non-permanent interconnection comprises screwing, press fitting, or snap fitting.

In embodiments, the porous membrane or mesh 150 may be fiber-based material, in examples such as polyester, polyamide, polypropylene, cotton, wool, rayon, cellulose, acrylic or any other suitable synthetic or natural fibrous material. In examples, the support element 160 may comprise material such as polypropylene, high impact polystyrene (HIPS), or acrylonitrile butadiene styrene (ABS), and may be manufactured by injection molding. In examples, the fiber-based material may be woven or non-woven.

In embodiments, the porous membrane or mesh 150 may be attached to the support element 160 mechanically, by ultrasonic welding, or with the use of adhesion. In examples the porous membrane or mesh 150 may be attached to the support element 160 mechanically by using for example self-tightening elastics, clamps, or hooks.

In embodiments, the elastic part 140 may comprise an elastomeric material with shore hardness ranging from Shore 20A to 90A, or in examples 30A to 60A. In some examples, the elastomeric material comprises thermoplastic elastomer.

In embodiments, the elastic part 140 may comprise an elastomeric material comprising a thermoplastic elastomer, in particular a styrenic block copolymer, thermoplastic polyolefin elastomers, thermoplastic vulcanizates, thermoplastic polyurethanes, thermoplastic copolyesters, polyether block amide, and/or silicon rubber.

In embodiments, the nib 130 may have a diameter between about 0.4 mm and 12 mm, specifically between about 4 mm to 5 mm, specifically between about 7 mm to 8 mm, or specifically between about 10 mm to 12 mm. In examples, the curvature radius at the extremity of the nib 130 is between about 0.1 mm and 5 mm and specifically between about 2 mm to 3 mm. In examples, the curvature radius of the nib 130 may not be constant but may decrease or increase towards the extremity of the nib 130. In examples, the curvature radius of the nib 130 may be constant towards the extremity of the nib 130.

In embodiments, the nib 130 may be made of fibrous or porous material. In some examples the fibrous or porous material may comprise polyester fibers, acrylic fibers, polyamide fibers, polyacetal, sintered ultra-high molecular weight PE or PP powders or non-woven felts (polyester, acrylic even wool).

In embodiments, the cross-section of the nib 130 may be circular, elliptical, rectangle, or square. In examples, the cross-section of the nib may vary along the longitudinal axis 111 of the writing instrument 100. The cross-section of the distal portion 131 of the nib 130 may depend on the kind of the writing instrument 100 and/or the purpose of the writing instrument 100. In embodiments, the writing instrument 100 may be a felt pen, a highlighter, or a permanent or non-permanent marker.

According to the second aspect, the method for manufacturing a writing instrument 100 is provided. The writing instrument comprises a tubular body 110, a porous membrane or mesh 150 surrounding at least a distal portion 131 of the nib 130, wherein, in a writing position, the porous membrane or mesh 150 is configured to contact the nib 130, thereby allowing ink to penetrate through the porous membrane or mesh 150. Further, the writing instrument comprises a cap assembly 170 further comprising the porous membrane or mesh 150, an elastic part 140 comprising at least one writing orifice 141 and surrounding at least a distal portion of the nib 130. The wall thickness and radius of the writing orifice 141 are configured such that in a non-writing position, the elastic part 140 extends beyond the nib 130 along a longitudinal axis 111 of the writing instrument 100. In a writing position, the cap assembly 170 is configured to contact the nib 130, thereby allowing ink to penetrate through the porous membrane or mesh 150. The method comprises connecting the porous membrane or mesh 150 and/or the cap assembly 170 to the tubular body 110 using permanent interconnection or non-permanent interconnection. In examples, the permanent interconnection comprises ultrasonic welding, snap fitting, adhesive bonding, solvent bonding, hot plate welding, spin welding, or insert molding. In embodiments, non-permanent interconnection comprises screwing, press fitting, or snap fitting.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics can be combined in any suitable combinations and/or sub-combinations in one or more embodiments or examples.

EMBODIMENTS

1. A writing instrument 100, comprising:
   a reservoir 120 for storing writing ink;
   a nib 130 arranged distally to the reservoir 120 and in fluid communication with the reservoir 120;
   a porous membrane or mesh 150 surrounding at least a distal portion of the nib 130;
   wherein, in a writing position, the porous membrane or mesh 150 is configured to contact the nib 130, thereby allowing ink to penetrate through the porous membrane or mesh 150.

2. The writing instrument 100 according to embodiment 1, wherein the porous membrane or mesh 150 is configured to yield starting from a non-writing position towards the writing position when pressure is applied to a first surface 151 of the porous membrane or mesh 150 facing away from the nib 130.

3. The writing instrument 100 according to embodiments 1 or 2, further comprising a cap assembly 170, comprising:
   the porous membrane or mesh 150;
   an elastic part 140 comprising at least one writing orifice 141 and surrounding at least the distal portion 131 of the nib 130; wherein the wall thickness and radius of the writing orifice 141 are configured such that in a non-writing position the elastic part 140 extends beyond the nib 130 along a longitudinal axis 111 of the writing instrument 100, and wherein, in a writing position, the cap assembly 140 is configured to contact the nib 130, thereby allowing ink to penetrate through the porous membrane or mesh 150.

4. The writing instrument 100 according to embodiment 3, wherein the elastic part 140 is configured to yield starting from the non-writing position towards the writing position when pressure is applied to a first surface of the cap assembly 170 facing away from the nib 130.

5. The writing instrument 100 according to any one of the preceding embodiments, wherein in the non-writing position the porous membrane or mesh 150 is configured to not contact the nib, thereby allowing the ink to dry on the porous membrane or mesh 150 and form a barrier to reduce ink evaporation through the nib or drying-out of the nib.

6. The writing instrument 100 according to any one of embodiments 3 to 5, wherein the cap assembly 170 and/or the porous membrane or mesh 150 is configured to return to the non-writing position when no pressure is applied to the first surface 151 of the cap assembly 170.

7. The writing instrument 100 according to any one of embodiments 3 to 6, wherein the cap assembly 170 is configured to yield starting from the non-writing position towards the nib 130 based on an elastic material of the elastic part 140.

8. The writing instrument 100 according to any one of embodiments 3 to 7, further comprising
   a tubular body 110 comprising a distal end 112,
   wherein the cap assembly 170 is attached to the distal end 112 of the tubular body 110.

9. The writing instrument 100 according to embodiment 8, further comprising
   a support element 160 attached to the distal end 112 of the tubular body 110 to serve as a connector between the tubular body 110 and the cap assembly 170; and
   wherein the support element 160 comprises a protruding portion 161 extending beyond the distal end of the tubular body 110; and
   wherein the porous membrane or mesh 150 is attached to the protruding portion 161.

10. The writing instrument 100 according to embodiment 9, wherein the support element 160 is attached to the distal end of the tubular body 110 on an inner circumferential surface or an outer circumferential surface of the tubular body 110.

11. The writing instrument 100 according to any one of embodiments 2 to 10, wherein the pressure is applied to the first surface 151 of the porous membrane or mesh 150 when a user writes with the writing instrument 100 on a writing surface.

12. The writing instrument 100 according to any one of the preceding embodiments, wherein in the non-writing position a distance (R) along a longitudinal axis 111 of the writing instrument 100 between a second surface 152 of the porous membrane or mesh 150 facing the nib 130 and the extremity of the nib 130 is between a value greater than 0 and a value equal to an external diameter 153 of the porous membrane or mesh 150 measured vertically to the longitudinal axis 111.

13. The writing instrument 100 according to any one of embodiments 3 to 12, wherein the elastic part 140 is dome-shaped around the distal portion of the nib 130, and the writing orifice 141 is centered with respect to the longitudinal axis 111 of the writing instrument.

14. The writing instrument 100 according to any one of embodiments 3 to 13 if at least dependent on embodiment 9, wherein the cap assembly 170 and/or the support element 160 are configured to be connected to the tubular body 110 using permanent interconnection or non-permanent interconnection.

15. The writing instrument 100 according to embodiment 14, wherein permanent interconnection comprises ultrasonic welding, snap fitting, adhesive bonding, solvent bonding, hot plate welding, spin welding, or insert molding.

16. The writing instrument 100 according to embodiments 14 or 15, wherein non-permanent interconnection comprises screwing, press fitting, or snap fitting.

17. The writing instrument 100 according to any one of the preceding embodiments, wherein the porous membrane or mesh 150 is a fiber-based material, such as polyester, polyamide, polypropylene, cotton, wool, rayon, cellulose, and/or acrylic.

18. The writing instrument 100 according to any one of the preceding embodiments if at least dependent on embodiment 9, wherein the support element 160 comprises material such as polypropylene, high impact polystyrene (HIPS), or acrylonitrile butadiene styrene (ABS), and is optionally manufactured by injection molding.

19. The writing instrument 100 according to any one of the preceding embodiments if at least dependent on embodiment 9, wherein the porous membrane or mesh 150 is attached to the support element 160 mechanically, by ultrasonic welding, or with the use of adhesion.

20. The writing instrument 100 according to any one of embodiments 3 to 19, wherein the elastic part 140 comprises an elastomeric material with shore hardness ranging from Shore 20A to 90A, more specifically 30A to 60A.

21. The writing instrument 100 according to embodiment 20, wherein the elastomeric material comprises a thermoplastic elastomer.

22. The writing instrument 100 according to any one of embodiments 3 to 21, wherein the elastic part 140 comprises an elastomeric material comprising a thermoplastic elastomer, in particular a styrenic block copolymer, thermoplastic polyolefin elastomers, thermoplastic vulcanizates, thermoplastic polyurethanes, thermoplastic copolyesters, polyether block amide, and/or silicon rubber.

23. The writing instrument 100 according to any one of the preceding embodiments, wherein the nib 130 has a diameter between about 0.4 mm and 12 mm, specifically between about 4 mm to 5 mm, specifically between about 7 mm to 8 mm, or specifically between about 10 mm to 12 mm.

24. The writing instrument 100 according to any one of the preceding embodiments, wherein the curvature radius at the extremity of the nib 130 is between about 0.1 mm and 5 mm and specifically between about 2 mm to 3 mm.

25. The writing instrument 100 according to any one of the preceding embodiments, wherein the nib 130 is made of fibrous or porous material.

26. The writing instrument 100 according to any one of the preceding embodiments, wherein the cross-section of the nib 130 is circular, elliptical, rectangle, or square.

27. The writing instrument 100 according to any one of the preceding embodiments, wherein the writing instrument 100 is a felt pen, a highlighter, or a permanent or non-permanent marker.

28. A method for manufacturing a writing instrument 100, wherein the writing instrument comprises:

a tubular body 110;

a porous membrane or mesh 150 surrounding at least a distal portion of the nib 130;

wherein, in a writing position, the porous membrane or mesh 150 is configured to contact the nib 130, thereby allowing ink to penetrate through the porous membrane or mesh 150; and/or a cap assembly 170, further comprising:

the porous membrane or mesh 150;

an elastic part 140 comprising at least one writing orifice 141 and surrounding at least a distal portion of the nib 130; wherein the wall thickness and radius of the writing orifice 141 are configured such that in a non-writing position the elastic part 140 extends beyond the nib along a longitudinal axis of the writing instrument, and wherein, in a writing position, the cap assembly 170 is configured to contact the nib 130, thereby allowing ink to penetrate through the porous membrane or mesh 150;

wherein the method comprises:

connecting the porous membrane or mesh 150 and/or the cap assembly 170 to the tubular body 110 using permanent interconnection or non-permanent interconnection.

29. A cap assembly 170 for a writing instrument 100 comprising a reservoir 120 for storing writing ink and a nib 130 arranged distally to the reservoir 120 and in fluid communication with the reservoir 120, wherein the cap assembly 170 comprises:

a porous membrane or mesh 150;

an elastic part 140 comprising at least one writing orifice 141 and surrounding at least a distal portion 131 of a nib 130;

wherein the wall thickness and radius of the writing orifice 141 are configured such that in a non-writing position the porous membrane or mesh 150 along with the elastic part 140 extends beyond the nib 130 along a longitudinal axis 111 of the writing instrument 100, and wherein, in a writing position, the cap assembly 140 is configured to contact the nib 130, thereby allowing ink to penetrate through the porous membrane or mesh 150.

The invention claimed is:

1. A writing instrument, comprising:

a reservoir for storing writing ink;

a nib arranged distally to the reservoir and in fluid communication with the reservoir;

a porous membrane or mesh surrounding at least a distal portion of the nib; and an elastic part positioned between the nib and the porous membrane, the elastic part extending beyond an end of the nib;

wherein, in a writing position, the porous membrane or mesh is configured to contact the nib, thereby allowing ink to penetrate through the porous membrane or mesh.

2. The writing instrument according to claim 1, wherein the porous membrane or mesh is configured to yield starting from a non-writing position towards the writing position when pressure is applied to a first surface of the porous membrane or mesh facing away from the nib, wherein the pressure is applied to the first surface of the porous membrane or mesh when a user writes with the writing instrument on a writing surface.

3. The writing instrument according to claim 1, further comprising a cap assembly, comprising:

the porous membrane or mesh;

the elastic part comprising at least one writing orifice and surrounding at least the distal portion of the nib;

wherein a wall thickness and a radius of the writing orifice are configured such that in a non-writing position the porous membrane or mesh along with the elastic part extends beyond the nib along a longitudinal axis of the writing instrument, and wherein, in a writing position, the cap assembly is configured to contact the nib, thereby allowing ink to penetrate through the porous membrane or mesh.

4. The writing instrument according to claim 3, wherein the elastic part is configured to yield starting from the non-writing position towards the writing position when pressure is applied to a first surface of the cap assembly facing away from the nib.

5. The writing instrument according to claim 3, wherein the cap assembly and/or the porous membrane or mesh is configured to return to the non-writing position when no pressure is applied to a first surface of the cap assembly.

6. The writing instrument according to claim 3, wherein the cap assembly is configured to yield starting from the non-writing position towards the nib based on an elastic material of the elastic part.

7. The writing instrument according to claim 3, further comprising a tubular body comprising a distal end, wherein the cap assembly is attached to the distal end of the tubular body.

8. The writing instrument according to claim 7, further comprising a support element attached to the distal end of the tubular body to serve as a connector between the tubular body and the cap assembly; and wherein the support element comprises a protruding portion extending beyond the distal end of the tubular body; and wherein the porous membrane or mesh is attached to the protruding portion.

9. The writing instrument according to claim 8, wherein the support element is attached to the distal end of the tubular body on an inner circumferential surface or an outer circumferential surface of the tubular body, and wherein the support element is configured to be connected to the tubular body using a permanent interconnection or non-permanent interconnection.

10. The writing instrument according to claim 3, wherein the cap assembly is configured to be connected to a tubular body using a permanent interconnection or non-permanent interconnection.

11. The writing instrument according to claim 3, wherein the elastic part is dome-shaped around the distal portion of the nib, and the writing orifice is centered with respect to the longitudinal axis of the writing instrument.

12. The writing instrument according to claim 3, wherein the elastic part comprises an elastomeric material with shore hardness ranging from Shore 20A to 90A.

13. The writing instrument according to claim 12, wherein the elastomeric material comprises a thermoplastic elastomer.

14. The writing instrument according to claim 13, wherein the thermoplastic elastomer, is a styrenic block copolymer, thermoplastic polyolefin elastomer, thermoplastic vulcanizate, thermoplastic polyurethane, thermoplastic copolyester, polyether block amide, and/or silicon rubber.

15. The writing instrument according to claim 1, wherein in a non-writing position the porous membrane or mesh is configured to not contact the nib, thereby allowing the ink to dry on the porous membrane or mesh and form a barrier to reduce ink evaporation through the nib or drying-out of the nib.

16. The writing instrument according to claim 1, wherein the writing instrument is a felt pen, a highlighter, or a permanent or non-permanent marker.

17. The writing instrument according to claim 1, wherein the nib has a diameter between about 0.4 mm and 12 mm.

18. The writing instrument according to claim 1, wherein the elastic part includes at least one writing orifice positioned between the end of the nib and the porous membrane or mesh.

19. The writing instrument according to claim 1, further comprising:

a tubular body enclosing a portion of the nib, wherein the elastic part is slidably connected to the tubular body.

20. A method for manufacturing a writing instrument, wherein the writing instrument comprises:

a tubular body;

a porous membrane or mesh surrounding at least a distal portion of a nib;

wherein, in a writing position, the porous membrane or mesh is configured to contact the nib, thereby allowing ink to penetrate through the porous membrane or mesh; and/or a cap assembly, further comprising:

the porous membrane or mesh;

an elastic part comprising at least one writing orifice and surrounding at least a distal portion of the nib, the elastic part positioned between the nib and the porous membrane; wherein a wall thickness and a radius of the writing orifice are configured such that in a non-writing position the elastic part extends beyond of the nib along a longitudinal axis of the writing instrument, and wherein, in a writing position, the cap assembly is configured to contact the nib, thereby allowing ink to penetrate through the porous membrane or mesh;

wherein the method comprises:

connecting the porous membrane or mesh and/or the cap assembly to the tubular body using permanent interconnection or non-permanent interconnection.

* * * * *